United States Patent [19]

Lapray

[11] Patent Number: 4,961,400
[45] Date of Patent: Oct. 9, 1990

[54] ROTATING BRUSH AERATION SYSTEM

[75] Inventor: Danny K. Lapray, Buhl, Id.

[73] Assignee: Clear Springs Trout Company, Buhl, Id.

[21] Appl. No.: 325,523

[22] Filed: Mar. 17, 1989

[51] Int. Cl.$^5$ .......................... A01K 63/00; B01F 3/04
[52] U.S. Cl. ........................................ 119/3; 261/92; 210/926
[58] Field of Search .................. 119/2, 3; 261/92, 89, 261/87; 210/926, 255, 620; 248/674, 675; 384/256, 257, 259, 442, 443, 444

[56] References Cited

U.S. PATENT DOCUMENTS

| | | | |
|---|---|---|---|
| 1,274,836 | 8/1918 | Anderson | 384/256 |
| 2,070,703 | 2/1937 | Williams | 384/440 |
| 3,747,904 | 7/1973 | Gross | 119/3 |
| 3,799,515 | 3/1974 | Geerlings | 261/92 |
| 4,614,589 | 9/1986 | Weis | 210/926 |
| 4,786,419 | 11/1988 | Mouratoglu et al. | 210/926 |

FOREIGN PATENT DOCUMENTS 2457639  1/1981  France .................................. 119/3

OTHER PUBLICATIONS

"A Model Study of Gravity Flow Cascade Aerators for Catfish Raceway Systems"; Chesness and Stephens; *Transactions of the American Society of Agricultural Engineers*; 14(6):1167–1169, 1174 1971.

*Primary Examiner*—Robert P. Swiatek
*Assistant Examiner*—T. Manahan
*Attorney, Agent, or Firm*—Schroeder, Davis & Orliss Inc.

[57] ABSTRACT

An apparatus for aerating fish ponds utilizes a cylindrical brush mounted for rotary motion below the top of a dam or headwall. Water passing over the dam and falling into a fish pond below the dam falls onto and over the cylindrical brush causing the brush to rotate. The rotating brush breaks up the falling water into droplets as the water passes through the brush bristles. Below the rotating brush, the water droplets fall through an air-water mixing zone where atmospheric oxygen is dissolved by the water droplets thus increasing the dissolved oxygen concentration of the water.

14 Claims, 5 Drawing Sheets

ROTATING BRUSH AERATION SYSTEM

BACKGROUND OF THE INVENTION

The present invention relates generally to an apparatus for increasing the dissolved oxygen concentration in flowing water for efficient raising of fish on a commercial scale where there is multiple use of water in a series of ponds or reservoirs. More specifically, the present invention relates to the utilization of the kinetic energy of falling water to rotate a bristle brush and break the stream of water into small droplets thereby increasing the water surface area and allowing increased absorption of atmospheric oxygen.

Fish farming and other types of aquaculture on a large, commercial basis have become an important source of food and other products for human consumption and is a rapidly growing industry. In the breeding and raising of various types of fish, rainbow trout for example, it is critical to the success of the operation that the fish are properly cared for including supplying sufficient levels of dissolved oxygen in the water that the fish are raised in. It is well-known that the number of fish that a pond or reservoir can support and the overall condition of the fish may be substantially increased by providing aeration of the pond water.

There are four basic types of aeration systems in use today: (1) gravity, (2) surface, (3) diffuser and (4) turbine. Each type operates on the principle of increasing the liquid surface area available for oxygen absorption and/or mixing the liquid to ensure that water of low oxygen concentration is brought in contact with air or oxygen gas. U.S. Pat. No. 3,747,904 entitled, "Apparatus for Aerating Water" granted to William R. Gross on July 24, 1973 discloses a paddle wheel including a plurality of air-gathering buckets partially immersed in the water and rotated to create an artificial current and to aerate the water. The paddle wheel of Gross provides mixing of the water and a greater surface area by agitation of the pond surface. Atmospheric air is also introduced into the pond water to provide increased absorption of atmospheric oxygen in the water.

Typically, rainbow trout are raised in ponds having a flow-through of water; i.e., the water will enter the pond at an upper or upstream end and exit the pond at a lower or downstream end. In order to allow multiple use of the water, the ponds will typically be arranged in a series (raceway) such that the water flows from a first, upper pond into a second, lower pond. Such systems may include as many as eight ponds, each pond lower in elevation than the preceding pond. Since the water level in the various ponds in such an aquaculture system is often controlled by small dams or weirs, water falling over the top of a weir is a common aerator design used to replenish the dissolved oxygen level in the water as the water passes from one pond to the next pond in the system. As the water falls over the weir it breaks up into droplets substantially increasing the water surface area. Additionally, the water passing over a weir creates turbulence as it falls into the pond below providing mixing and aeration of the pond water.

While waterfalls are very effective aerators, modifications such as splash boards provide substantially increased efficiency. Chesness and Stephens, in an article entitled "A Model Study of Gravity Flow Aerators for Catfish Raceway System" published in the Transactions of the ASAE (1971), studied several gravity aerator designs including a weir with a rotating brush. The rotating brush was mounted at the foot of the weir partially immersed in the water and positioned and supported in such a manner that the falling water passing over the weir impacted the upstream side of the brush, causing rotation of the brush toward the headwall. The depth of immersion into the pond was chosen to provide maximum turbulence of the pond water.

SUMMARY OF THE INVENTION

The present invention provides a bristle brush rotatably mounted transversely across the face of a weir separating a first, upper pond from a second, lower pond. The brush is mounted near the top of the weir and positioned in front of or on the face of the weir such that the water passing over the weir falls onto and through the brush causing the brush to rotate. The water passing over the weir and falling on to the rotating brush is broken up into droplets thereby substantially increasing the water surface area and reducing the surface tension. The vertical height between the rotating brush and the surface of the lower pond provides an air-water mixing zone where atmospheric oxygen is dissolved by the falling water droplets. The greater surface area and reduced surface tension also promote the loss to the atmosphere of undesirable dissolved gases such as nitrogen and carbon dioxide. Further, ammonia toxicity decreases as the dissolved oxygen concentration increases. The falling water also creates turbulence and surface agitation in the lower pond providing additional mixing and aeration of the lower pond water.

The rotating brush of the present invention provides a highly efficient aerator which is inexpensive and easily constructed. The rotating brush utilizes the kinetic energy of falling water and requires no external or additional power source. Further, the rotating brush is self-cleaning and provides an impassable fish barrier whereas an unimpeded plunge, such as a splash board, is a readily utilized fish ladder.

Other features and advantages of the present invention will become apparent from the following description taken in conjunction with the accompanying drawings wherein are set forth, by way of illustration and example, certain embodiments of the invention.

DETAILED DESCRIPTION OF THE PREFERRED EMBODIMENT

Figure 1:
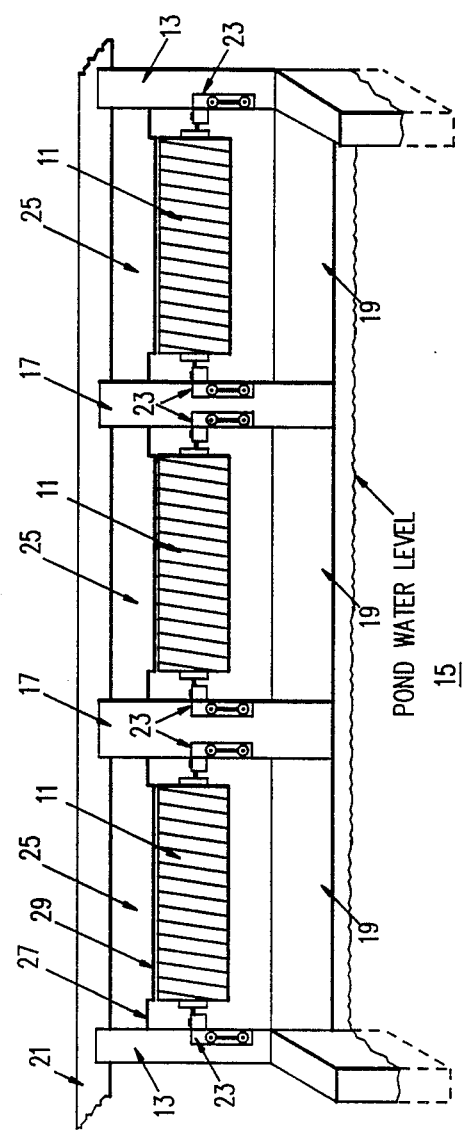
FIG. 1 is a front plan view of a series of rotating brushes mounted in front of a weir in accordance with the principles of the present invention.
Figure 2:
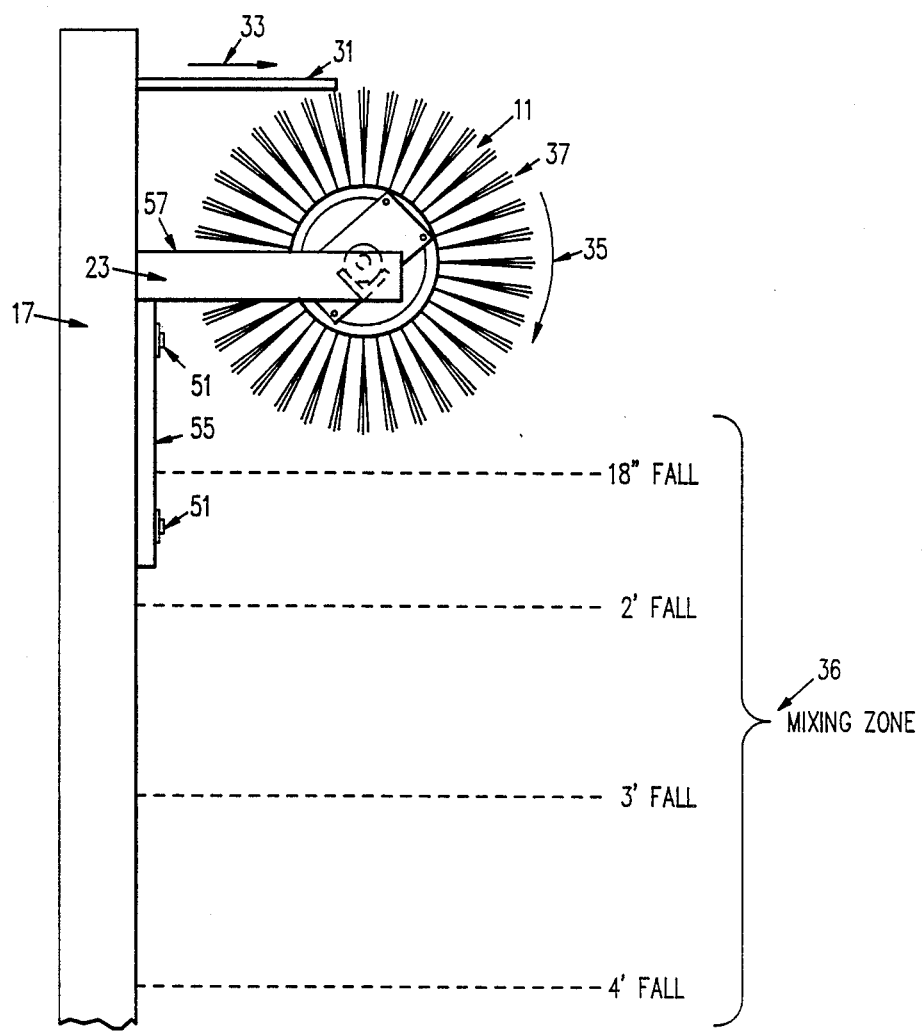
FIG. 2 is a side view of one of the rotating brushes shown in FIG. 1.

Referring now to FIGS. 1 and 2, a series of rotating brushes 11 mounted transversely across the front of a weir in accordance with the principles of the present invention is shown. A raceway or series of long, relatively narrow ponds 15 are formed by concrete pond walls 13. The individual ponds are separated by dams or weirs which also set the water level in each pond 15, an upstream pond having a higher water level than a downstream pond. The dam or weir is formed by mounting heavy dam or weir boards 19 between concrete pilasters 17 and the pond walls 13. Slots (not shown) are formed in the sides of the concrete pilasters 17 and the pond walls 13 for receiving the weir boards 19. One or more weir boards 19 are stacked up in the slots to build the weir to any desired height, typically, two to four feet. A walkway 21 may be constructed across the top of the weir. A brush 11 is rotatably mounted on brackets 23 to extend transversely across and in front of each weir section 25. The top weir board 27 includes a long notch 29 to define a spillway for the water leaving the upper pond behind the weir. A weir brush plate 31 is attached to the top weir board 27 and extends the length of the notch 29. The weir brush plate 31 extends outwardly, normal to the top weir board 27, over the brush 11 and ensures that the water passing over the weir, in the direction shown by arrow 33, falls on the brush 11. The brush 11 is positioned directly under and adjacent the weir brush board 31 such that the force of the falling water causes the brush 11 to rotate in the direction indicated by arrow 35. When properly positioned, the brush 11 will rotate at a speed of 60 to 90 revolutions per minute (rpm) and the brush bristles 37 will extend through the falling water. As the water falls over the rotating brush through the bristles 37, the water stream is broken up into droplets providing a greater surface area and lower surface tension. The droplets fall through an air-water mixing zone 36 to the pond below the weir. In the mixing zone 36, atmospheric oxygen is dissolved in the water thereby increasing the dissolved oxygen level of the water. The height of the mixing zone 36 is determined by the overall height of the weir and the overall diameter of the rotating brush 11.

Figures 3A, 3B, 3C:
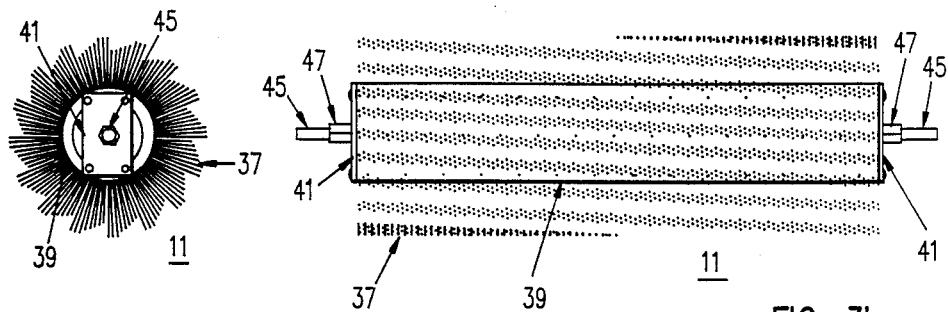
FIG. 3a and 3b are a side view and an end view, respectively, of a horizontal bristle spiral brush.
FIGS. 3c is an end view illustrating the center shaft of a brush used in the rotating brushes shown in FIG. 1.
Figures 4A, 4B:
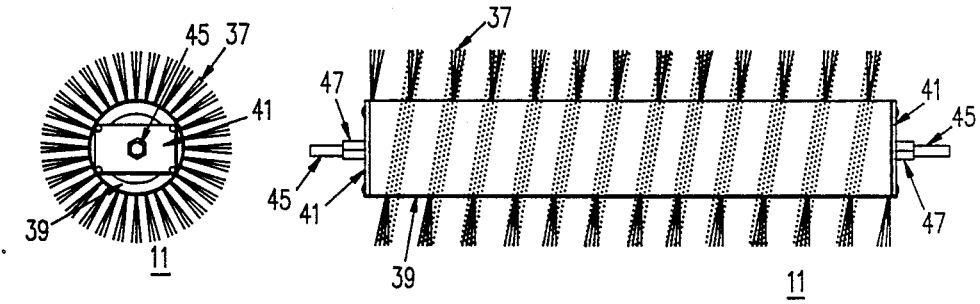
FIGS. 4a and 4b are a side view and an end view respectively, of a vertical bristle spiral brush.

Referring now also to FIGS. 3a, 3b, 3c, 4a and 4b, brush 11 comprises a plastic or nylon brush core or body 39 having end plates 41 attached by screws 43 and a central shaft or rod 45 aligned with the longitudinal axis of the brush core 39 and extending through the end plates 41. Each end of the central shaft 45 is threaded and is rigidly attached to the end plates 41 by nuts 47. Central shaft 45 may be of stainless steel or other suitable material and extend the full length of the brush core 39 or, if the brush core is sufficiently rigid, a relatively short mounting stud 49 extending through the end plate 41 at each end of the brush core 39 and aligned with the central axis of the brush core 39 may be utilized. The mounting stud 49 is rigidly attached to end plate 41 by a pair of nuts 47 (as shown in FIG. 3c). Stiff nylon or plastic bristles 37 extend radially outwardly from the brush core 39. The bristles 37 may be arranged n a horizontal spiral (as shown in FIGS. 3a and 3b) or in a vertical spiral (as shown in FIGS. 4a and 4b).

The brush 11 may have any suitable size and any number of bristles 37. The size of the brush 11 is determined primarily by the water flow rate over the weir. The greater the number of bristles 37, the more efficiently the rotating brush 11 breaks up the falling water. However, increasing the number of bristles above a threshold number, provides minimum increase in efficiency. The rotating brushes illustrated in FIG. 1 have a brush core 39 diameter of 8 inches with 4 inch bristles for a total brush diameter of 16 inches and a length of 50 inches and are used with a water flow rate of 1.6 to 2.0 cubic-feet-second. A lower flow rate will allow the use of smaller diameter brushes to achieve the necessary aeration. Commercially available brushes suitable for this purpose are FLO-PAC brush numbers 700250 and 700450 manufactured by Pacific Coast Brush Company.

Figures 5A, 5B, 5C:
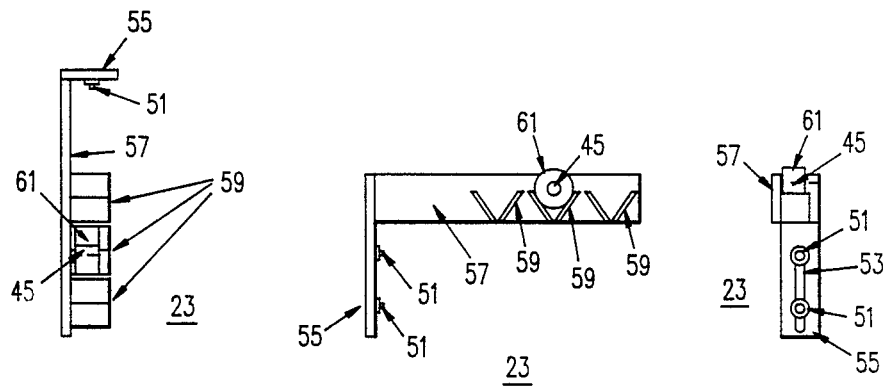
FIGS. 5a, 5b and 5c are a top view, side view and front view, respectively, of the rotating brush mounting brackets shown in FIG. 1.

Referring now also to FIGS. 5a, 5b and 5c, the brush 11 is rotatably supported by L-shaped metal mounting brackets 23 bolted or otherwise rigidly attached to the pond side walls 13 or the concrete pilasters 17 by bolts 51 (as shown in FIGS. 1 and 2). The wall mount plate 55 of the mounting bracket 23 which is bolted to the side wall 13 or pilaster 17 includes a vertical slot 53 to provide vertical adjustment of the brush 11 position below the weir brush board 31. The brush mounting plate 57 extends horizontally outwardly from the face of the weir and has 1 or more V-shaped bearing brackets 59 welded or otherwise rigidly attached to it. The bearing brackets 59 are spaced at suitable points along the brush mounting plate 57 to allow horizontal adjustment of the brush 11 position under the weir brush board 31. The brush 11 is supported between 2 mounting brackets 23 by central shaft 45 rotatably mounted in nylon or TEFLON (polytetrafluorethylene) bearings 61 setting in corresponding bearing brackets 59. The weight of the brush 11 and the force of the water passing over the weir falling on the brush 11 maintain the bearings 61 in the bearing brackets 59 while the brush mounting plate 57 prevents transverse movement of the brush 11. The mounting brackets 23 and other metal components are preferably painted or otherwise treated or of stainless steel to minimize corrosion.

Figure 6:
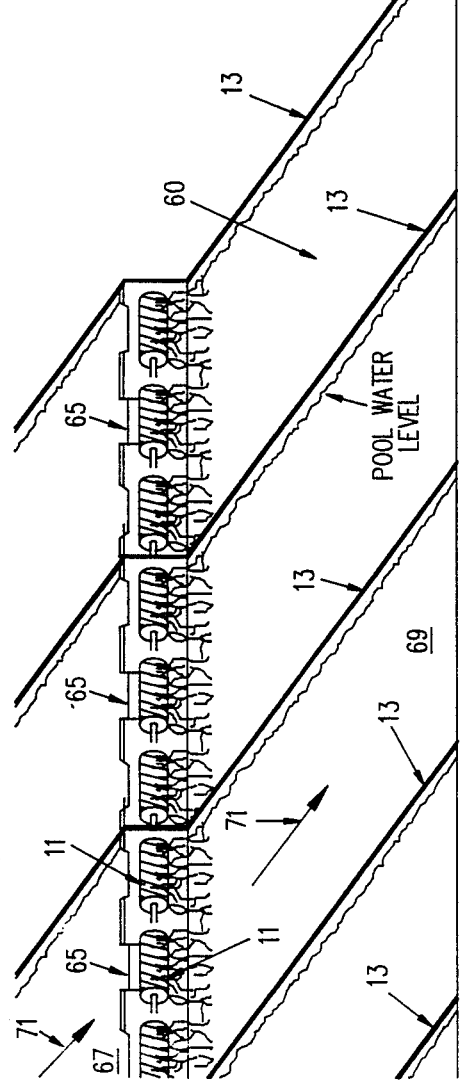
FIG. 6 is a perspective view of a multiple water use raceway pond system utilizing weir-mounted rotating brushes to provide aeration according to the principles of the present invention.
Figure 6:
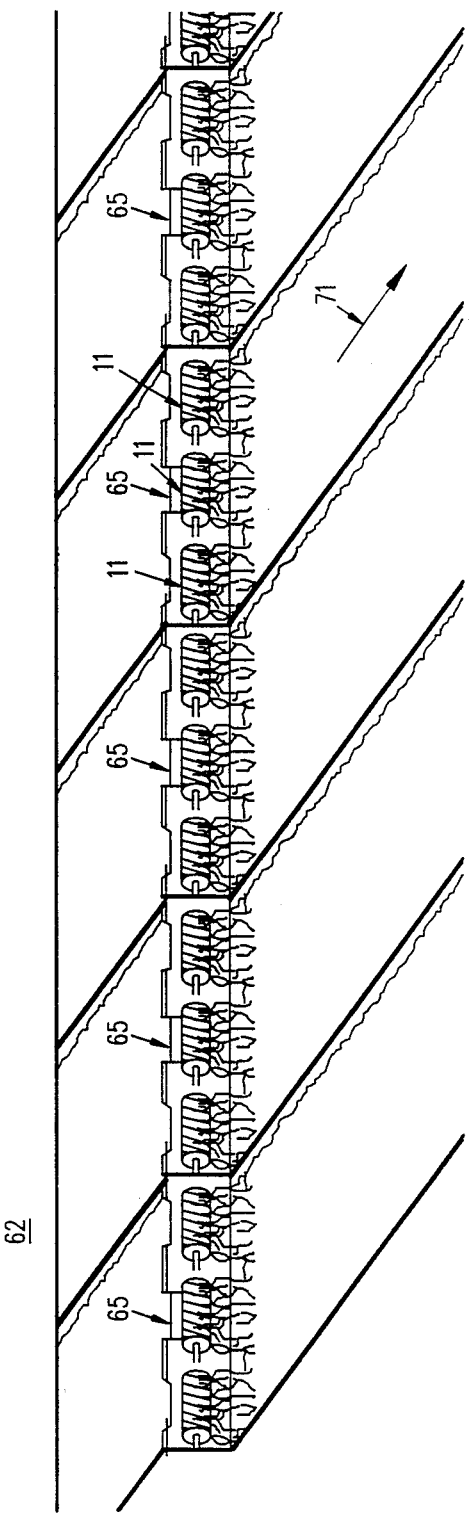

Referring now to FIG. 6, a typical multiple water use raceway system fish hatchery is shown. A large number of long, relatively narrow ponds 60 are defined by concrete side walls 13 and dams or weirs 65. A walkway 62 provides access to the individual ponds 60. The water level in each pond 60 is controlled by the height of the weir 65 at the downstream end of the pond. The water level in a first, upper pond 67 having a greater elevation than the water level in a second, lower pond 69. The water flows through the ponds in the direction indicated by the arrows 71, flowing through an upper pond 67, passing over the weir 65 and falling onto and over the rotating brushes 11 to the next lower pond 69. When the length of bristles 37 (as shown in FIG. 2) is sufficient for the bristles 37 to extend through the surface of the water falling over the rotating brush 11, the rotating brush 11 will also act as an efficient fish barrier preventing fish from swimming up the water fall from the lower pond 69 to the higher pond 67.

Fish present in a pond 67, for example, will deplete the level of dissolved oxygen in the water as the water flows through the pond 67. The water passes over the weir 65 and falls onto the rotating brushes 11 and is broken up into droplets as it passes through the brush bristles. As the water droplets fall through the air-water mixing zone below the rotating brush 11 (as shown in FIG. 2), atmospheric oxygen is dissolved in the water thereby increasing the level of dissolved oxygen in the water. The oxygen level depletion and recharging cycle is repeated as the water flows through the next pond 69 and over the weir 65 and rotating brushes 11 at the downstream end of the pond 69 thereby allowing multiple use of the water. Typically, in large commercial hatcheries, this pond configuration may be repeated to allow up to 8 consecutive uses of the water.

When fresh water first enters a pond at its upstream end, the dissolved oxygen level may be as high as the saturation level for the water temperature, approximately 9.2 parts-per-million (ppm), although, the dissolved oxygen level will typically be substantially below the saturation level. The amount of dissolved oxygen depletion as the water flows through the pond is a function of the number and size of fish present in the pond as well as the activity level of the fish. The number of fish in a pond is controlled to achieve a minimum dissolved oxygen level of approximately 5 ppm. While the fish are able to utilize the dissolved oxygen at levels less than 5 ppm, undesirable high stress in the fish will result. The maximum amount of dissolved oxygen available to the fish is 4.2 ppm and, in practice, is typically substantially less than the maximum. Measurements taken at the downstream end of a pond adjacent the weir showed a range of 5.1 to 5.8 ppm dissolved oxygen concentration; the lowest level being observed during periods of high activity, feeding for example. Measurements taken at the upstream end of the next lower pond below the weir showed a range of 7.2 to 7.8 ppm dissolved oxygen concentration, an increase or recharge range of 2.0 to 2.4 ppm. The greater the amount of oxygen depletion (i.e., the lower the dissolved oxygen concentration), the greater the efficiency of any passive method, a rotating brush for example, will be at recharging (i.e., increasing the dissolved oxygen concentration) the flowing water. The closer the dissolved oxygen concentration is to saturation, the lesser the amount of oxygen which may be dissolved in the water. For example, water having an initial dissolved oxygen concentration of 5.0 ppm may be recharged to a concentration of 7.4 ppm while water having a concentration of 7.8 ppm, initially, may only be recharged to a concentration of 8.5 ppm.

The dissolved oxygen concentration measurements taken for a weir having a drop of 4 feet with a mixing zone 36 of approximately 2 ½ feet (as shown in FIG. 2) are shown in Table 1 below.

TABLE 1

ROTATING BRUSH AT TOP OF 4 FOOT SINGLE PLUNGE

| DATE | TIME | POND 1 PPM $O_2$ | POND 2 PPM $O_2$ | RECHARGE PPM $O_2$ |
|---|---|---|---|---|
| Day 1 | 2:30 | 5.1 | 7.2 | 2.1 |
| | 2:35 | 5.2 | 7.3 | 2.1 |
| | 2:45 | 5.1 | 7.3 | 2.2 |
| | 2:50 | 5.1 | 7.2 | 2.1 |
| | 3:15 | 5.1 | 7.2 | 2.1 |
| Day 2 | 2:00 | 5.5 | 7.8 | 2.3 |
| | 2:10 | 5.6 | 7.8 | 2.2 |
| | 2:20 | 5.6 | 7.7 | 2.1 |
| | 2:45 | 5.8 | 7.8 | 2.0 |
| | 2:55 | 5.4 | 7.8 | 2.4 |
| Average ppm | | 5.35 | 7.51 | |
| Recharge Range | | 2.0 ppm–2.4 ppm | | |
| Recharge Average | | 2.16 ppm | | |

Dissolved oxygen recharge measurements for several different gravity aeration methods are summarized in Table 2 below. The concrete splash method comprises water passing over a weir and falling 3 feet on to a splash pad or board and then falling an additional 1 foot into the next lower pond. The single plunge method comprises water passing over a weir and falling unimpeded into the next lower pond from the specified height. The double plunge method comprises water passing over a weir and falling unimpeded half the total weir height to an intermediate pond and then falling unimpeded the remaining half of the weir height into the next lower pond.

TABLE 2

Summary of Results

| | Recharge in PPM | |
|---|---|---|
| Method | RANGE PPM $O_2$ | AVERAGE PPM $O_2$ |
| Concrete Splash | .9–1.2 | 1.06 |
| Single 48" Plunge | 1.4–1.8 | 1.60 |
| Double 2' × 2' Plunge | 1.5–1.8 | 1.65 |
| Rotating Brush | 2.0–2.4 | 2.16 |

The amount of atmospheric oxygen dissolved by the falling water increases as the height of fall, i.e., the height of the air-water mixing zone 36, increases and the overall effectiveness of the aeration also increases with an increase in the height of fall. However, the aeration efficiency per unit of fall height decreases as the fall height increases because the concentration of dissolved oxygen increases with increased fall height. Therefore, the lower the water drop from pond to pond, 2 feet rather than 4 feet for example, the more efficient the aeration or recharging process is. Further, the rotating brush is more efficient than a plunge or splash at lower drop heights. If water drop heights or elevation difference are limited at a facility, the rotating brush as described herein will provide efficient aeration of the water provided that the minimum water fall height between consecutive ponds or water uses provides sufficient height to install the rotating brush above the surface of the pond below the weir. The actual height of the mixing zone 36 (as shown in FIG. 2) necessary is minimal provided that the rotating brush 11 is positioned above the surface of the water. The minimum total fall height or weir height required is the fall height necessary to provide sufficient head to rotate the brush 11 and to have the brush above the water surface. For example, the 16-inch brush described herein requires a minimum fall height of approximately 18 inches.

Figure 7:
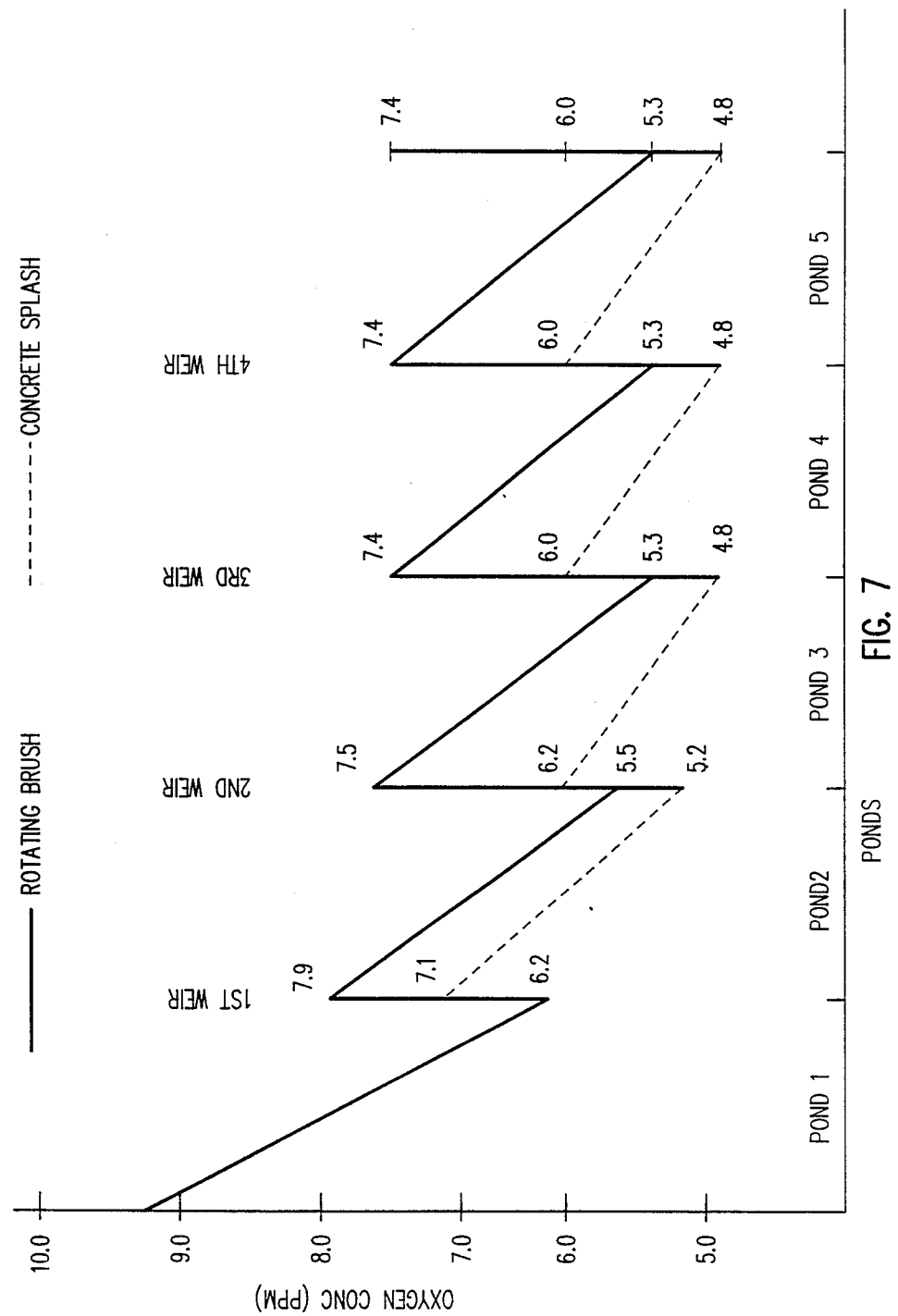
FIG. 7 is a plot graphically illustrating and comparing the oxygen depletion and recharge for a rotating brush system and a concrete splash system in a raceway pond system such as shown in FIG. 6.

Referring now also to FIG. 7, the oxygen depletion and recharge in terms of oxygen concentration (ppm) in a series of five consecutive ponds or water uses 76, 78, 80, 82 and 84 is plotted for a rotating brush system (solid line 75) and a concrete splash system (dashed line 77), respectively. The water in both systems is assumed to have an initial oxygen concentration of 9.2 ppm and exhibits a depletion to 6.2 ppm during transit of the first pond 76. After passing over the first weir at the downstream end of the first pond 76 into the second pond 78, the water in the rotating brush system has recovered to 7.9 ppm oxygen while the water in the concrete splash system has recovered to 7.1 ppm. The second pond 78 depletes the water to 5.5 ppm for the brush system and 5.2 ppm for the concrete splash system. Recovery passing over the second weir at the downstream end of the second pond 78 into the third pond 80 is to 7.5 ppm for the brush system and 6.2 for the concrete splash system. Similarly, passing over the third, fourth and fifth weirs provides recovery to 7.4 ppm for the brush system and 6.0 ppm for the concrete splash system. In each case the available oxygen for the rotating brush aeration system is greater than that provided by the concrete splash aeration system. Summarizing over the five weirs, the brush system added 10.0 ppm dissolved oxygen while allowing a use of 11.9 ppm dissolved oxygen and the concrete splash system added 5.5 ppm dissolved oxygen while allowing a use of 8.7 ppm dissolved oxygen. Thus, it can be seen that the benefit of the higher efficiency rotating brush is cumulative over the series of ponds.

In the preferred embodiment, total fall height (weir height above the level of the next lower pond) is set at 4 feet while the air-water mixing zone is approximately 2.67 feet. The results recorded in Table 1 and 2 were for a total fall height of 4 feet. The rotating brush 11 mounted just below the top of a 4 foot weir produced the best overall aeration.

Thus the present invention provides an apparatus for efficient aeration of the water in a pond assuring an adequate supply of dissolved oxygen for a large number of fish while allowing multiple use of the water and requiring no external power source. While a specific embodiment of the invention has been described by way of example, it is understood that the invention is not restricted solely thereto, but rather it is intended to include all embodiments thereof which would be apparent to one skilled in the art and which come within the spirit and scope of the appended claims.

I claim:

1. Apparatus for aerating a stream of water passing over a dam and falling into a body of water below the dam, said apparatus comprising:
   an elongated, cylindrical brush; and
   mounting means rigidly attached to a face of a dam near the top of said dam for rotatably mounting said cylindrical brush in front of said dam with the longitudinal axis of said cylindrical brush disposed transversely across the face of said dam, said cylindrical brush spaced outwardly from the face of said dam and positioned below the top of said dam such that the water passing over said dam falls onto and over said cylindrical brush, said cylindrical brush responsive to the falling water for rotation thereof, said cylindrical brush mounted a predetermined height above the surface of said body of water providing an air-water mixing zone between said cylindrical brush and the surface of said body of water.

2. Apparatus as in claim 1 wherein said cylindrical brush comprises a cylindrical brush body having a predetermined length and a plurality of brush bristles extending radially outwardly therefrom, said cylindrical brush body including central shaft means protruding from each end thereof for rotatably mounting said cylindrical brush to said mounting means.

3. Apparatus as in claim 2 wherein said central shaft means comprises bearing means mounted on said shaft means at each end of said cylindrical brush body for rotatably mounting said cylindrical brush to said mounting means.

4. Apparatus as in claim 3 wherein said bearing means comprises a pair of TEFLON bushing, one of said bushings mounted on said shaft means at each end of said cylindrical brush body.

5. Apparatus as in claim 3 wherein said central shaft means further comprises a pair of stainless steel rods of predetermined length, one of said stainless steel rods fixedly attached to said cylindrical brush body at each end thereof and protruding therefrom, said stainless steel rods disposed on said longitudinal axis.

6. Apparatus as in claim 2 wherein said mounting means comprise a pair of L-shaped brackets disposed in spaced apart relationship, each of said L-shaped brackets oriented such that one leg of said L-shaped bracket extends horizontally outwardly from the face of said dam, the other leg of said L-shaped bracket being vertically oriented and bolted to the face of said dam, said cylindrical brush rotatably mounted on said horizontal bracket legs with said cylindrical brush body disposed between said L-shaped brackets.

7. Apparatus as in claim 6 wherein said vertically oriented bracket leg includes a vertically oriented slot for adjusting the vertical position of said cylindrical brush below the top of said dam.

8. Apparatus as in claim 7 wherein said central shaft means includes bearing means mounted on said shaft means at each end of said cylindrical brush body.

9. Apparatus as in claim 8 wherein each of said horizontally oriented bracket legs further comprise at least two bearing brackets attached thereto, each of said at least two bearing brackets spaced at a different horizontal distance from the face of said dam, said at least two bearing brackets receiving said bearing means for rotatably mounting said cylindrical brush, said cylindrical brush selectably spaced from the face of the dam such that the falling water impacts said cylindrical brush thus imparting rotation thereof away from said dam, the falling water being broken up into droplets by said rotating brush.

10. Apparatus as in claim 2 wherein each of said plurality of brush bristles is of sufficient length to extend through the surface of said water passing over said dam and falling onto and over said cylindrical brush.

11. A multiple water use fish hatchery comprising:
   a plurality of ponds arranged consecutively such that water flows into an upstream end of a pond and exits said pond at a downstream end thereof, each of said consecutively arranged ponds having a surface elevation lower than the surface elevation of a pond immediately preceding it and higher than the surface elevation of a pond immediately following it, said surface elevation of each pond controlled by the height of a dam at the downstream end of said pond, the water flowing through a pond and over said dam at said downstream end of the pond falling into the upstream end of the next, lower pond; and
   an elongated cylindrical brush rotatably mounted in front of a face of said dam at the downstream end of each pond the longitudinal axis of said cylindrical brush disposed transversely across the face of said dam, said cylindrical brush spaced outwardly from the face of said dam and disposed below the top of said dam and above the surface of said next, lower pond such that the water flowing over said dam falls onto and over said cylindrical brush, said cylindrical brush responsive to said falling water for rotation thereof, said cylindrical brush mounted out of the water providing an air-water mixing zone between said cylindrical brush and the surface of said next, lower pond.

12. A multiple water use fish hatchery as in claim 11 wherein said cylindrical brush comprises a cylindrical brush body having a predetermined length and a plurality of brush bristles extending radially outwardly therefrom, said cylindrical brush body including means protruding from each end thereof for rotatably mounting said cylindrical brush on said dam.

13. A multiple water use fish hatchery as in claim 12 wherein each of said plurality of brush bristles is of sufficient length to extend through the surface of said water flowing over said dam and falling onto and over said cylindrical brush.

14. A multiple water use fish hatchery as in claim 12 wherein said dam at the downstream end of each pond has a predetermined height, said predetermined height having a minimum value slightly greater than a diameter of said cylindrical brush rotatably mounted on said dam such that said cylindrical brush is disposed slightly above the surface of said next, lower pond.

* * * * *